United States Patent
Yamaguchi (10) Patent No.: US 8,614,837 B2
(45) Date of Patent: Dec. 24, 2013

(54) IMAGE SCANNING DEVICE, IMAGE FORMING APPARATUS, AND IMAGE SCANNING METHOD

(75) Inventor: Kenta Yamaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 208 days.

(21) Appl. No.: 13/052,260

(22) Filed: Mar. 21, 2011

(65) Prior Publication Data

US 2011/0235112 A1     Sep. 29, 2011

(30) Foreign Application Priority Data

Mar. 26, 2010   (JP) ................................ 2010-073814

(51) Int. Cl.
*H04N 1/40* (2006.01)
*H04N 1/04* (2006.01)

(52) U.S. Cl.
USPC ............................ 358/446; 358/445; 358/474

(58) Field of Classification Search
None
See application file for complete search history.

(56) References Cited

U.S. PATENT DOCUMENTS

| 7,782,496 B2 | 8/2010 | Tsukahara et al. | |
|---|---|---|---|
| 2003/0117676 A1* | 6/2003 | Nakamura et al. | 358/513 |
| 2008/0212146 A1* | 9/2008 | Tsukahara et al. | 358/446 |

FOREIGN PATENT DOCUMENTS

| JP | 2000-122188 | 4/2000 |
|---|---|---|
| JP | 3262609 | 3/2002 |
| JP | 2007-258760 | 10/2007 |

* cited by examiner

*Primary Examiner* — Huo Long Chen
(74) *Attorney, Agent, or Firm* — IPUSA, PLLC (57) ABSTRACT

An image scanning device includes an image sensor obtaining an analog image signal; a variable gain amplifier amplifying the analog image signal; an analog-to-digital converter converting the amplified analog image signal into digital image data; a highest value detection unit detecting the highest value in the digital image data; and an amplifier gain setting unit setting an amplifier gain of the variable gain amplifier. The amplifier gain setting unit initially sets the amplifier gain of the variable gain amplifier such that the highest value in first digital image data of a reference image falls within a predetermined range, and if the highest value in second digital image data of the reference image obtained with the initially-set amplifier gain exceeds the predetermined range, the amplifier gain setting unit decreases the amplifier gain of the variable gain amplifier.

7 Claims, 7 Drawing Sheets

IMAGE SCANNING DEVICE, IMAGE FORMING APPARATUS, AND IMAGE SCANNING METHOD

CROSS-REFERENCE TO RELATED APPLICATION

The present application is based upon and claims the benefit of priority of Japanese Patent Application No. 2010-073814, filed on Mar. 26, 2010, the entire contents of which are incorporated herein by reference.

BACKGROUND OF THE INVENTION

1. Field of the Invention

A certain aspect of this disclosure relates to an image scanning device, an image forming apparatus including the image scanning device, and an image scanning method.

2. Description of the Related Art

An image scanning device optically scans a document to obtain image information and converts the image information into an electric signal. An image forming apparatus including the image scanning device prints an image on a recording medium such as paper based on the electric signal. Generally, such an image scanning device (or an image forming apparatus) obtains two-dimensional image information of a document as strips of images (hereafter called "line images") with a small width. More specifically, an image scanning device uses an image sensor (hereafter called a line sensor) to convert each line (each line image) of a document into an electric signal, and obtains image information of the entire document by changing positions on the document to be illuminated (this is called "optical scanning") and collecting electric signals from the line sensor.

Japanese Patent No. 3262609 discloses an image forming apparatus including an image scanning unit. The image scanning unit includes a charge coupled device (CCD) as a line sensor for converting a line image into an electric signal (analog image signal); a scanning optical system that optically scans a document line by line (line image by line image) and forms a reduced-size line image on the CCD; and an image signal processing circuit that amplifies the analog image signal from the CCD and converts the amplified analog image signal into digital image data. The CCD is a collection of small optical sensors (hereafter called "pixels") that are arranged in a line. The image scanning unit also includes a shading correction circuit for compensating for the variation in the sensitivity of the pixels and the variation in the illumination caused by the scanning optical system.

Japanese Laid-Open Patent Publication No. 2000-122188 discloses a shading correction method. In the disclosed shading correction method, a white plate (hereafter called a reference white plate) provided near a document table is scanned with a line sensor to obtain digital image data of a line image of the reference white plate before scanning a document, and the digital image data are used as correction data. Here, the pixels constituting the line sensor output electric signals when the reference white plate is scanned. Since the reference white plate has a uniform white color, the levels of the electric signals from the pixels are ideally the same. In practice, however, the levels of the electric signals vary due to the variation in the sensitivity of the pixels and the variation in the illumination. For this reason, the electric signals are converted into digital values, and multiplier coefficients are obtained for the respective pixels such that the digital values are equalized. The obtained multiplier coefficients are used as correction values for the pixel outputs.

By the way, the theoretical maximum range (output dynamic range) of output data of an image signal processing circuit of an image scanning device is determined by the number of bits used for the output data. Using the entire output dynamic range for digital image data makes it possible to express gradations and colors of a document in detail.

Here, the white color of the reference white plate is determined to provide a highest digital value in a document image. Therefore, to obtain digital image data using the entire output dynamic range when scanning a document, it is preferable to set the amplifier gain of the image signal processing circuit such that a digital value obtained by scanning the reference white plate becomes close to the maximum value that can be expressed by the number of bits used for the digital image data.

JP2000-122188 also discloses a method for automatically setting the amplifier gain using a variable gain amplifier the gain of which can be electrically changed. In the disclosed method, a reference white plate is scanned once before scanning a document to obtain an analog image signal indicating a line image of the reference white plate, and the analog image signal is amplified by the variable gain amplifier and converted into digital image data. Then, a central processing unit (CPU) adjusts the gain of the variable gain amplifier such that the highest value in the digital image data falls within a predetermined range (target white level range). However, since the gain of a variable gain amplifier is normally changeable by a predetermined step, for example, by 3 dB steps (0 dB, +3 dB, +6 dB, ...) and there is a difference between a set gain value and the actual gain, it is difficult to accurately adjust the gain solely by a variable gain amplifier. To compensate for this problem, a digital amplifier that multiplies input digital data by a variable multiplier coefficient may be provided at the output side of an analog-to-digital converter.

However, since the image signal processing circuit of the related-art image scanning device adjusts the gain based only on a line image obtained by scanning the reference white plate once, the gain adjusting process is easily influenced by noise.

Here, since a reference white plate has a uniform white color and line image data of the reference white plate are averaged to some extent, the influence of noise can be normally ignored.

However, if there is dust or a flaw on the reference white plate, an extreme peak level caused, for example, by a reflection from the dust or flaw may be observed in line image data obtained by scanning the reference white plate. In such a case, it is difficult to properly average the line image data and to properly adjust the gain of the variable gain amplifier by removing the influence of noise. This may cause the image signal processing circuit to continuously output the maximum value determined by the number of bits used for output data and may also cause the image scanning device including the image signal processing circuit to fail.

Although the influence of noise may be reduced by scanning the reference white plate multiple times, this may increase the time for scanning, increase the time for adjusting the gain, and thereby increase the start-up time of an image forming apparatus. When both a variable gain amplifier and a digital amplifier are used to accurately adjust the gain, a peak level is detected to set the gain of the variable gain amplifier and then a peak level is detected again to obtain a multiplier coefficient for correcting an error in the gain of the variable gain amplifier. Therefore, in this case, the time necessary to adjust the gain becomes far longer.

SUMMARY OF THE INVENTION

In an aspect of this disclosure, there is provided an image scanning device including an image sensor obtaining an analog image signal; a variable gain amplifier amplifying the analog image signal; an analog-to-digital converter converting the amplified analog image signal into digital image data; a highest value detection unit detecting the highest value in the digital image data; and an amplifier gain setting unit setting an amplifier gain of the variable gain amplifier. The amplifier gain setting unit initially sets the amplifier gain of the variable gain amplifier such that the highest value in first digital image data of a reference image falls within a predetermined range, and if the highest value in second digital image data of the reference image obtained with the initially-set amplifier gain exceeds the predetermined range, the amplifier gain setting unit decreases the amplifier gain of the variable gain amplifier.

DESCRIPTION OF THE PREFERRED EMBODIMENTS

An image scanning device according to an embodiment of the present invention is described below with reference to the accompanying drawings. The image scanning device may be included in an image forming apparatus such as a printer, a copier, a facsimile machine, or a multifunction peripheral.

Figure 1:
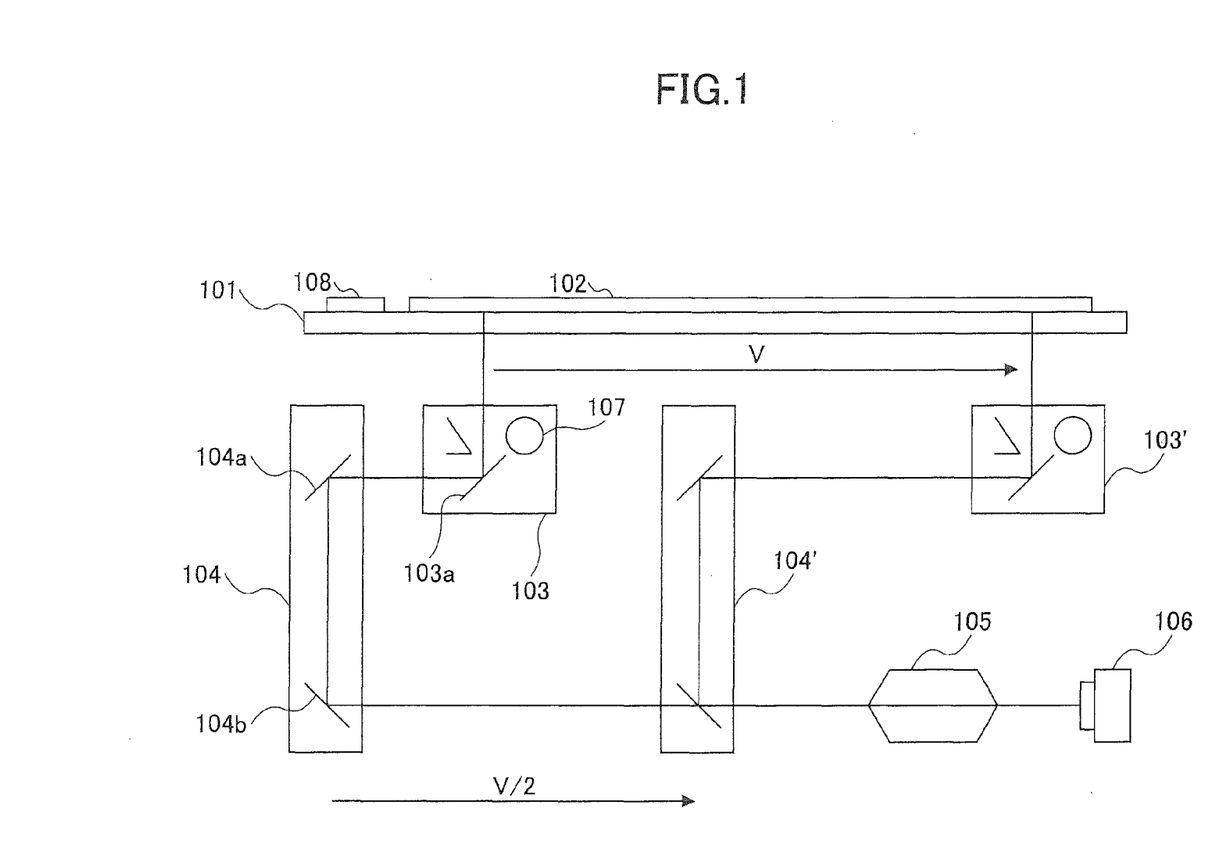
FIG. 1 is a drawing illustrating an exemplary configuration of a scanning optical system of an image scanning device according to an embodiment of the present invention.

FIG. 1 is a drawing illustrating an exemplary configuration of a scanning optical system of the image scanning device of this embodiment. The scanning optical system is used to obtain an analog image signal to be input to an image signal processing circuit 1 described later. The scanning optical system includes a contact glass 101 on which a document 102 is to be placed. The document 102 is illuminated by an illumination optical system including a light source 107 disposed below the contact glass 101. Light reflected from the illuminated document 102 is deflected by a first mirror 103a of a first moving body 103 and a first mirror 104a and a second mirror 104b of a second moving body 104, and is thereby caused to enter an imaging lens 105. The imaging lens 105 focuses the light to form a reduced-size image on a light-receiving surface of a CCD 106 that is a line sensor. In a document scanning process, the first moving body 103 moves at a speed V along the length direction of the document 102 to a position indicated by 103' to scan the entire length of the document 102, and along with the movement of the first moving body 103, the second moving body 104 moves at one half of the speed V of the first moving body 103 to a position indicated by 104'.

A reference white plate 108 is also provided near an end of the contact glass 101. The reference white plate 108 is used as a reference image to obtain data for shading correction and automatic gain control.

Figure 2:
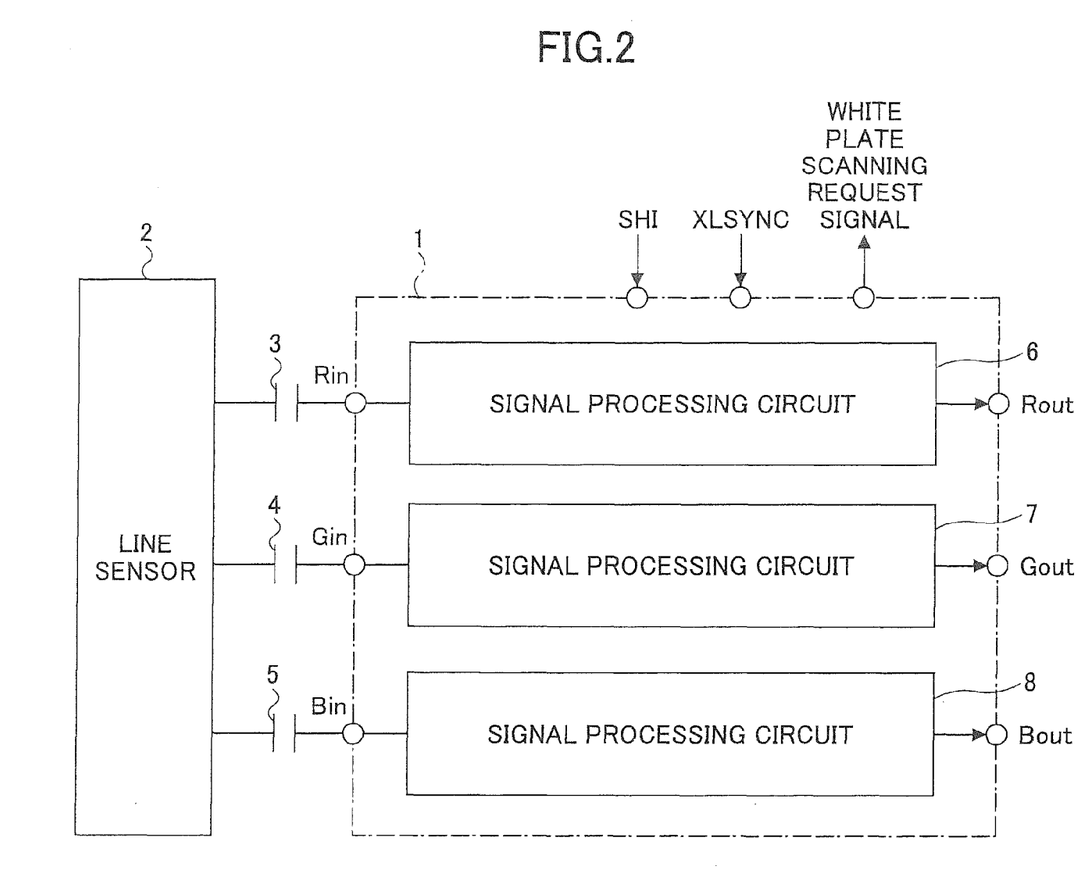
FIG. 2 is a drawing illustrating an exemplary configuration of an image signal processing circuit of an image scanning device according to an embodiment of the present invention.

FIG. 2 is a drawing illustrating an exemplary configuration of an image signal processing circuit 1 of the image scanning device of this embodiment. The image signal processing circuit 1 includes signal processing circuits 6, 7, and 8 for amplifying analog image signals and converting the analog image signals into digital signals. The signal processing circuits 6, 7, and 8, respectively, receive analog image signals Rin, Gin, and Bin corresponding to red, green, and blue from a line sensor 2 (corresponding to the CCD 106 of FIG. 1) via capacitors 3, 4, and 5. The signal processing circuits 6, 7, and 8 process the received analog image signals Rin, Gin, and Bin and output corresponding digital image signals Rout, Gout, and Bout. Also, a signal SHI and a signal XLSYNC are input to the image signal processing circuit 1. The signal SHI is used for sampling of analog signals in the signal processing circuits 6, 7, and 8. The signal XLSYNC indicates an analog signal input period corresponding to one line image obtained by the line sensor 2.

An exemplary configuration of the signal processing circuit 6 is described below. Since the signal processing circuits 6, 7, and 8 have substantially the same configuration, the descriptions below also apply to the signal processing circuits 7 and 8.

Figure 3:
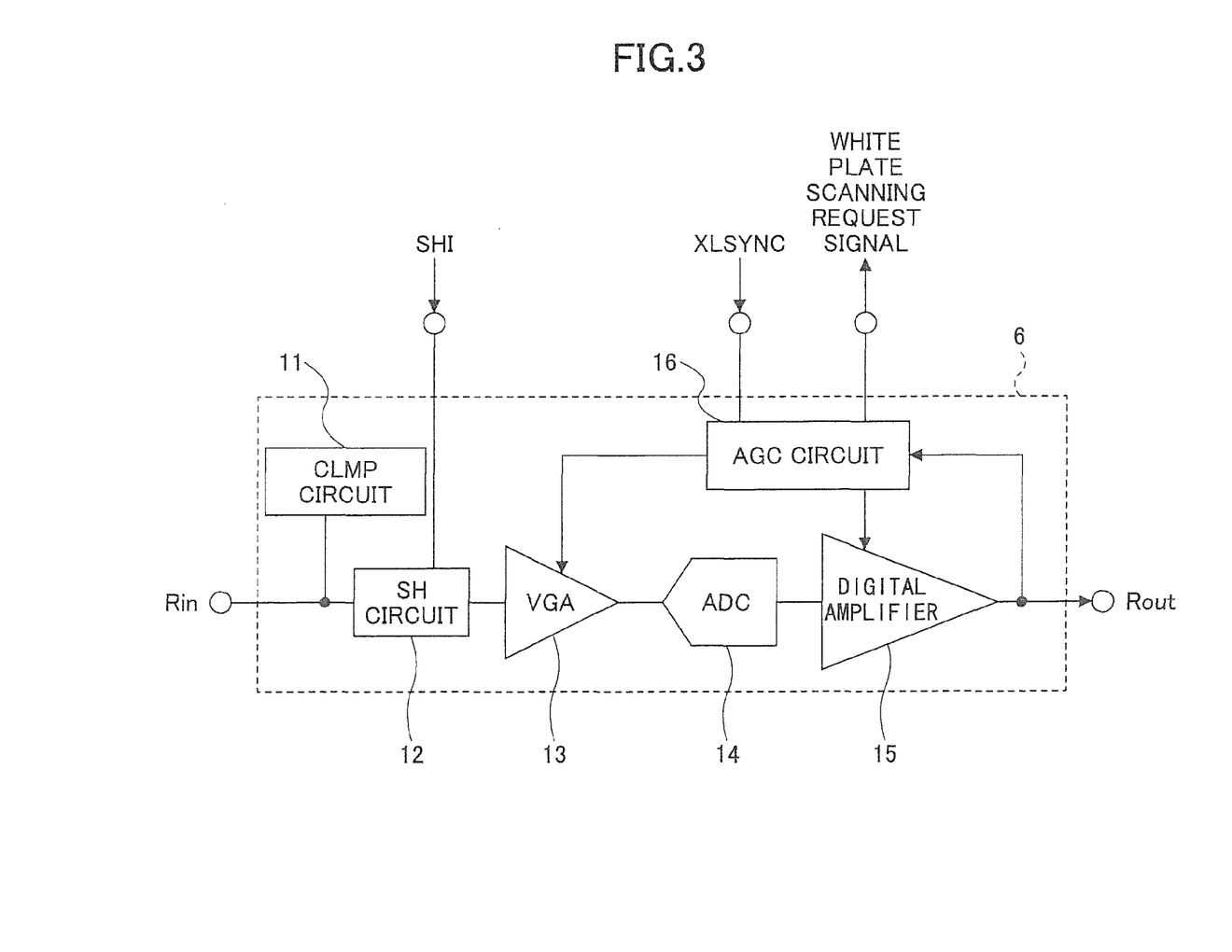
FIG. 3 is a drawing illustrating an exemplary configuration of a signal processing circuit of an image signal processing circuit according to an embodiment of the present invention.

FIG. 3 is a drawing illustrating an exemplary configuration of the signal processing circuit 6.

The signal processing circuit 6 includes a clamping (CLMP) circuit 11 for limiting (or clamping) the electric potential of the analog image signal Rin, a sample-and-hold (SH) circuit 12 for holding the clamped analog image signal Rin at predetermined time intervals, a variable gain amplifier (VGA) 13 (variable gain amplifying unit) for amplifying an output signal from the SH circuit 12, an analog-to-digital converter (ADC) 14 for converting an output signal from the VGA 13 into a digital signal (digital image data), a digital amplifier 15 (digital amplifying unit) for amplifying the digital signal output from the ADC 14, and an automatic gain control (AGC) circuit 16 that sets an amplifier gain of the VGA 13 and a multiplier coefficient of the digital amplifier 15 to keep the digital image data output from the digital amplifier 15 within a predetermined range. The amplifier gain of the VGA 13 can be gradually changed, for example, by 3 dB steps from 0 dB to +12 dB.

Figure 4:
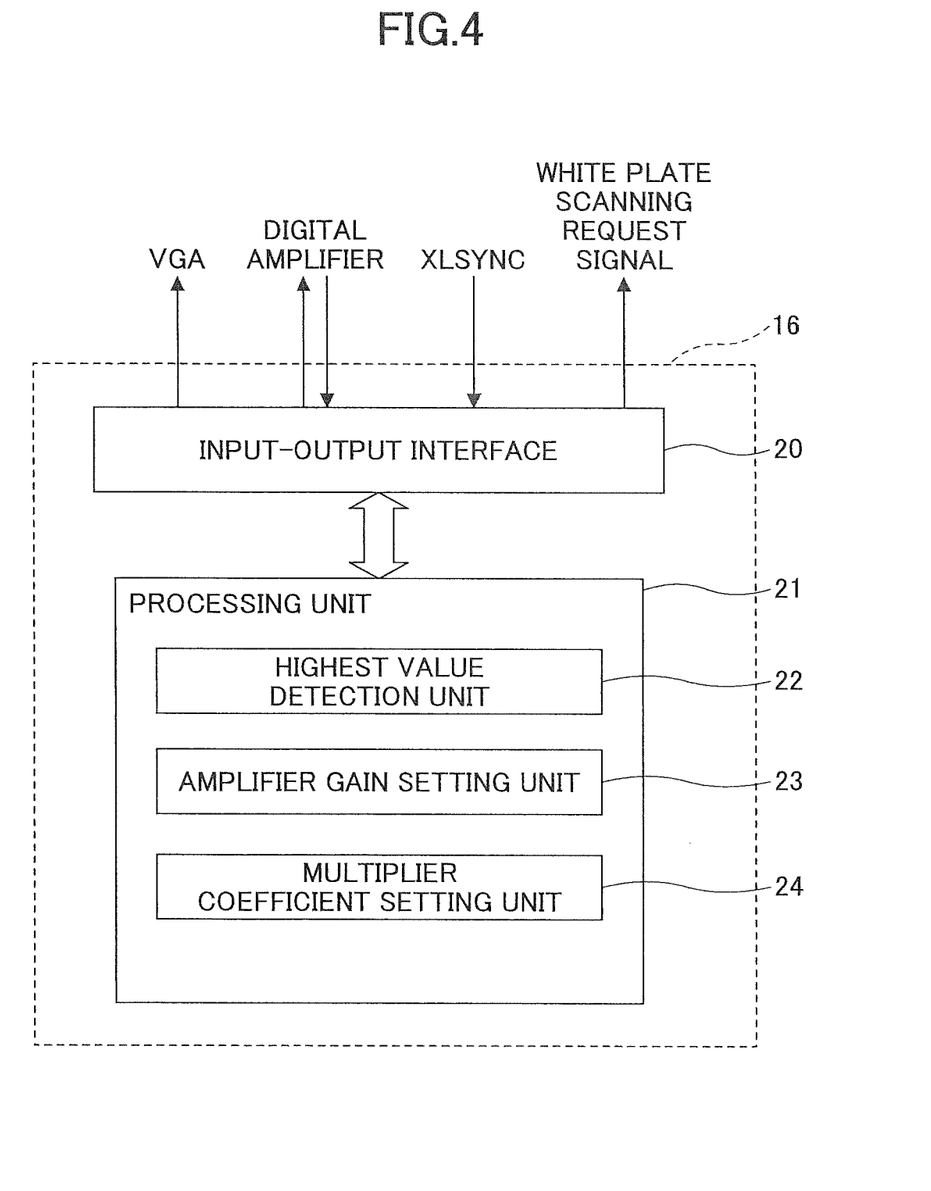
FIG. 4 is a drawing illustrating an exemplary configuration of an AGC circuit of the signal processing circuit illustrated in FIG. 3.

FIG. 4 is a drawing illustrating an exemplary configuration of the AGC circuit 16.

The AGC circuit 16 includes an input-output interface 20 for sending and receiving data to and from the VGA 13, the digital amplifier 15, and other components; and a processing unit 21 implemented by hardware components such as a central processing unit (CPU), a read only memory (ROM) for storing programs, and a random access memory (RAM) for temporarily storing data. The processing unit 21 includes a highest value detection unit 22 for detecting the highest value in digital image data, an amplifier gain setting unit 23 for setting the amplifier gain of the VGA 13, and a multiplier coefficient setting unit 24 for setting the multiplier coefficient of the digital amplifier 15. These functional components are implemented by executing programs by the CPU of the processing unit 21.

With the above configuration, when the image scanning device including the image signal processing circuit 1 of this embodiment is turned on, the AGC circuit 16 starts an amplifier gain setting process. In the amplifier gain setting process, the AGC circuit 16 outputs a scanning request signal (white plate scanning request signal) requesting to scan the reference white plate 108 to a control unit (not shown) of the image scanning device. In response to the scanning request signal, the control unit of the image scanning device starts a process for scanning the reference white plate 108 using the scanning optical system of FIG. 1. When receiving first digital image data obtained by scanning the reference white plate 108 once, the highest value detection unit 22 of the AGC circuit 16 detects the highest value in the digital image data, and the amplifier gain setting unit 23 sets the amplifier gain of the VGA 13 such that the highest value matches a predetermined value (or falls within a predetermined range). Then, the AGC circuit 16 outputs a scanning request signal to request the control unit of the image scanning device to scan the reference white plate 108 again to obtain second digital image data. The amplifier gain setting unit 23 determines whether the highest value in the second digital image data is greater than the predetermined value and if the highest value is not greater than the predetermined value, terminates the amplifier gain setting process. Meanwhile, if the highest value in the second digital image data is greater than the predetermined value, the amplifier gain setting unit 23 reduces the amplifier gain of the VGA 13 by one step (e.g., 3 dB) and terminates the amplifier gain setting process.

Generally, the step size (e.g., 3 dB) for changing the amplifier gain of the VGA 13 is greater than the variation of the highest value in digital image data between scanning operations of the reference white plate 108 with a flaw or dust. Therefore, when the highest value in the second digital image data is greater than the predetermined value, it is possible to quickly and automatically adjust the amplifier gain of the image signal processing circuit 1 and to prevent the output saturation of the image signal processing circuit 1 by decreasing the amplifier gain of the VGA 13 by one step.

After the amplifier gain setting process for the VGA 13 is completed by the amplifier gain setting unit 23, the multiplier coefficient setting unit 24 of the AGC circuit 16 sets the multiplier coefficient of the digital amplifier 15 such that the digital image data matches the predetermined value (or fall within the predetermined range).

An exemplary amplifier gain setting process for setting the amplifier gain of the VGA 13 of the image signal processing circuit 1 is described below with reference to FIG. 5.

When the user turns on the image scanning device including the image signal processing circuit 1 of this embodiment (S101), the AGC circuit 16 initializes the amplifier gain of the VGA 13 and the multiplier coefficient of the digital amplifier 15 (S102).

Next, the AGC circuit 16 sends a scanning request signal to request the control unit of the image scanning device to scan the reference white plate 108 once (S103). In response to the scanning request signal, the control unit of the image scanning device scans the reference white plate 108 (S104). Then, the AGC circuit 16 receives one set of digital image data obtained by scanning the reference white plate 108 once (S105). The highest value detection unit 22 detects the highest value in the received digital image data (S106), and the amplifier gain setting unit 23 determines whether the highest value is out of a predetermined range (hereafter called a target range) (S107). If the highest value is within the target range (NO in S107), the amplifier gain setting unit 23 terminates the amplifier gain setting process for the VGA 13 (S115). Meanwhile, if the highest value is out of the target range (YES in S107), the amplifier gain setting unit 23 sets the amplifier gain of the VGA 13 such that the highest value falls within the target range (S108).

Next, the AGC circuit 16 sends a scanning request signal to request the control unit of the image scanning device to scan the reference white plate 108 one-hundred times (S109). In response to the scanning request signal, the control unit of the image scanning device scans the reference white plate 108 (S110). Then, the AGC circuit 16 receives one-hundred sets of digital image data obtained by scanning the reference white plate 108 one-hundred times (S111). The highest value detection unit 22 of the AGC 16 detects the highest value in the received digital image data (S112), and the amplifier gain setting unit 23 determines whether the highest value exceeds the target range (S113). If the highest value does not exceed the target range (NO in S113), the amplifier gain setting unit 23 terminates the amplifier gain setting process for the VGA 13 (S115). Then, the AGC circuit 16 proceeds to a multiplier coefficient setting process for setting the multiplier coefficient of the digital amplifier 15. If the highest value exceeds the target range (YES in S113), the amplifier gain setting unit 23 decreases the amplifier gain of the VGA 13 by one step (S114) and terminates the amplifier gain setting process for the VGA 13 (S115). Then, the AGC circuit 16 proceeds to a multiplier coefficient setting process for setting the multiplier coefficient of the digital amplifier 15.

Next, a multiplier coefficient setting process for setting the multiplier coefficient of the digital amplifier 15 of the image signal processing circuit 1 is described below with reference to FIG. 6.

After the amplifier gain setting process for the VGA 13 is completed, the AGC circuit 16 sends a scanning request signal to request the control unit of the image scanning device to scan the reference white plate 108 one-hundred times (S201). In response to the scanning request signal, the control unit of the image scanning device scans the reference white plate 108 (S202). Then, the AGC circuit 16 receives one-hundred sets of digital image data obtained by scanning the reference white plate 108 one-hundred times (S203). The highest value detection unit 22 of the AGC 16 detects the highest value in the received digital image data (S204), and the multiplier coefficient setting unit 24 determines whether the highest value is out of the target range (S205).

If the highest value is out of the target range (YES in S205), the multiplier coefficient setting unit 24 sets the multiplier coefficient of the digital amplifier 15 such that the highest value falls within the target range (S206) and terminates the multiplier coefficient setting process. Meanwhile, if the highest value in the received digital image data is within the target range (NO in S205), the multiplier coefficient setting unit 24 terminates the multiplier coefficient setting process.

Figure 5:
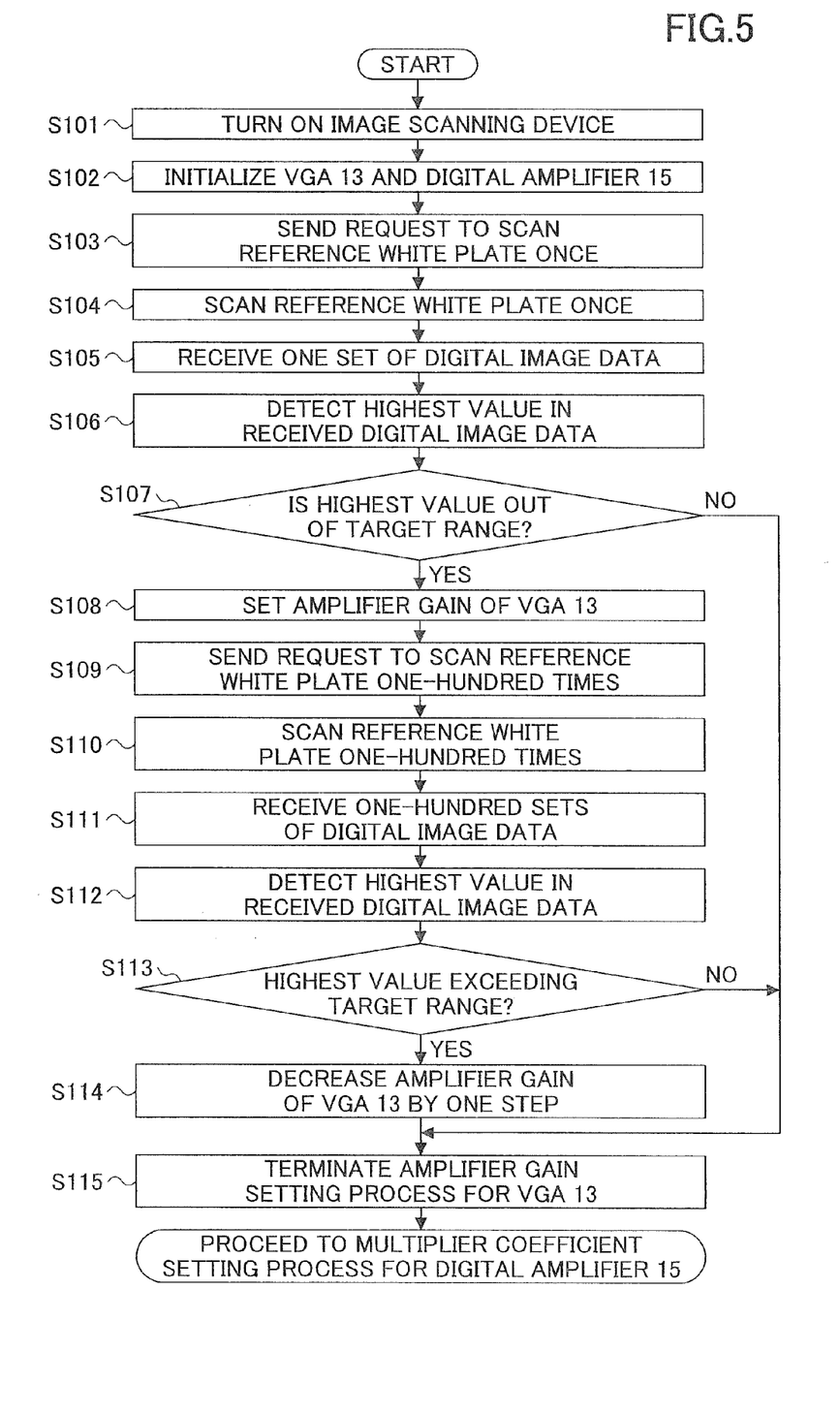
FIG. 5 is a flowchart showing an exemplary process of setting an amplifier gain of a VGA of a signal processing circuit.
Figure 6:
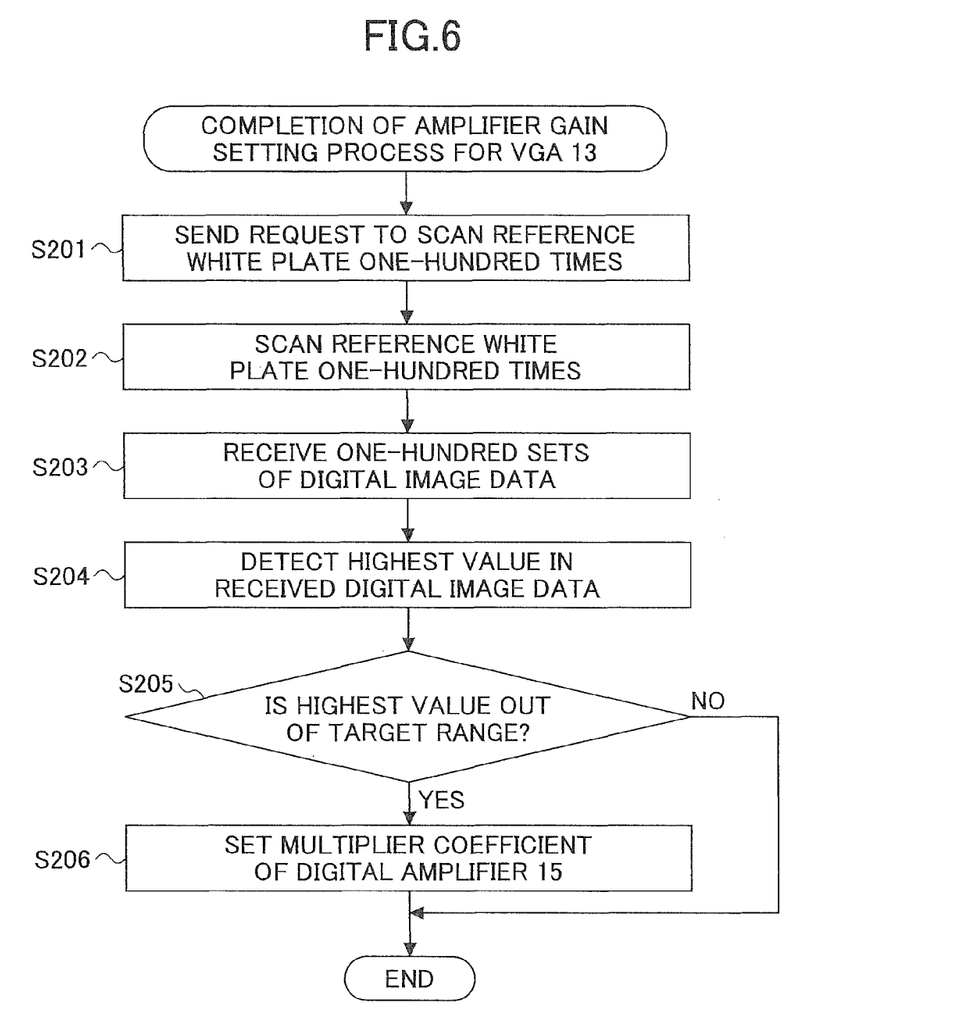
FIG. 6 is a flowchart showing an exemplary process of setting a multiplier coefficient of a digital amplifier of a signal processing circuit.

The highest value detected by the highest value detection unit 22 in step S112 of FIG. 5 and step S204 of FIG. 6 may be the highest value in one hundred sets of digital image data or an average of the highest values in one hundred sets of digital image data.

Next, effects of the above embodiment are described.

First, digital image data obtained by scanning the reference white plate 108 with a flaw or "bright" dust is described with reference to FIG. 7.

Figure 7:
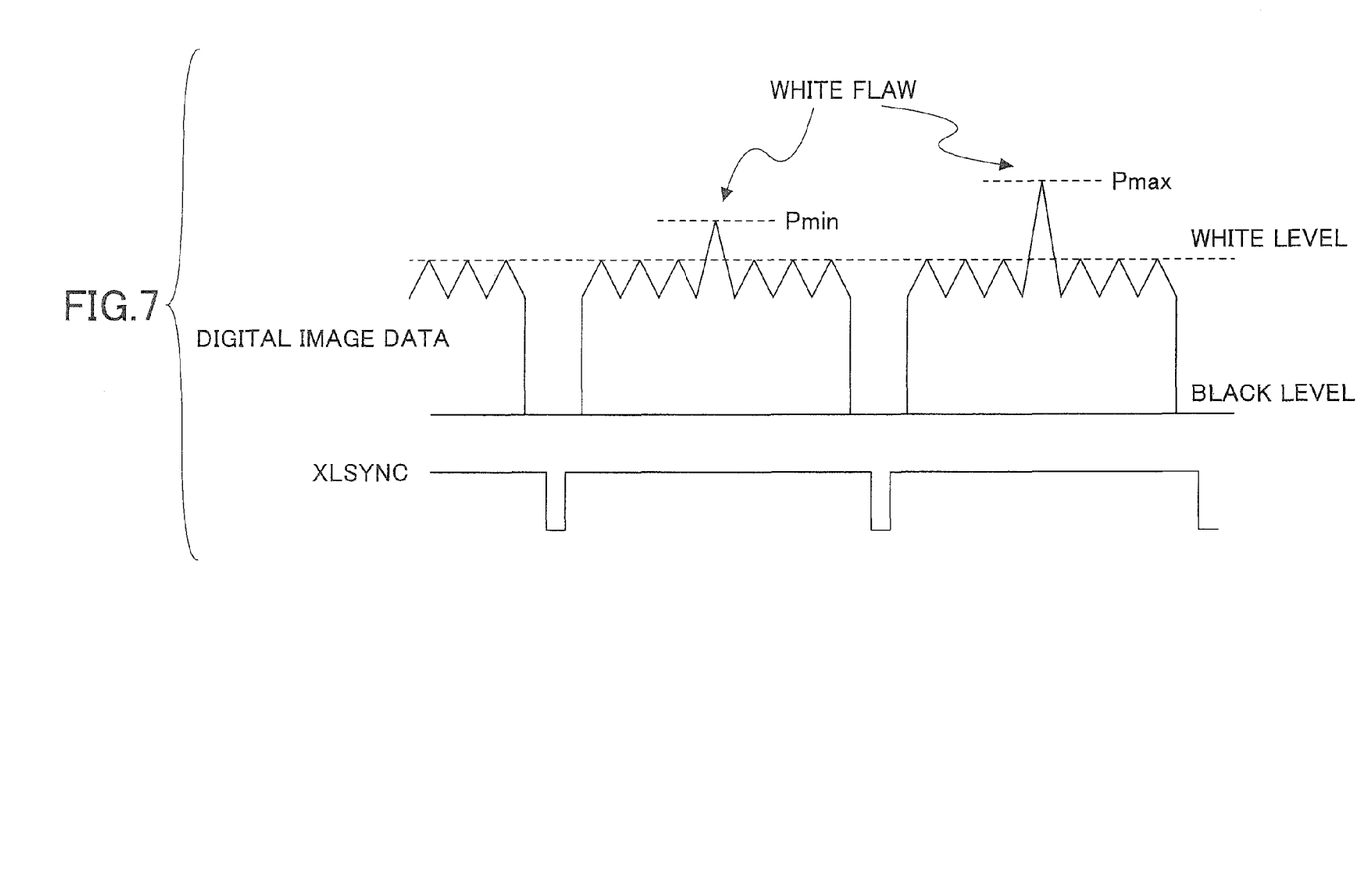
FIG. 7 is a drawing illustrating digital image data obtained by scanning a reference white plate with a flaw or dust.

In FIG. 7, XLSYNC indicates a synchronization signal indicating the start and end of each set of line image data. One set of line image data starts at a point where XLSYNC rises from the low level to the high level and ends at a point where XLSYNC falls from the high level to the low level. The point where XLSYNC rises next time indicates the start of the next line image data. A waveform above XLSYNC in FIG. 7 indicates digital image data obtained by scanning the reference white plate 108.

An analog image signal output from the line sensor 2 is represented by a series of signals output in sequence from a row of pixels constituting the line sensor 2. The digital image data are obtained by simply converting the analog image signal into digital values. Therefore, the waveform indicating the digital image data in FIG. 7 is obtained by converting the series of signals output from the pixels arranged in a line in the line sensor 2 into digital values and by rearranging the digital values along the time axis. In other words, a position in the digital image data waveform along the time axis corresponds to the spatial position of a pixel in the line sensor 2 outputting a signal at the corresponding timing. Since the digital image data in FIG. 7 are obtained by scanning the reference white plate 108, small peaks of the waveform indicate the white level and the lowest reference level corresponds to the black level.

When there is a flaw or "bright" dust on the reference white plate 108, the pixel corresponding to the position of the flaw or the dust outputs an extreme value that is the highest value in the digital image data. Accordingly, the highest value is output from the same pixel or at the same position in the digital image data waveform each time the reference white plate 108 is scanned. Meanwhile, the highest value changes each time the reference white plate 108 is scanned according to the variation of the output signal from the line sensor 2 that is caused, for example, by noise. Here, the highest one of the highest values in multiple sets of digital image data (line image data) is called Poutmax, the lowest one of the highest values is called Poutmin, and the levels of the analog image signal from the line sensor corresponding to Poutmax and Poutmin are called Pinmax and Pinmin, respectively.

Let us assume that Poutmin is detected as the highest value in a scanning operation and the automatic gain control is performed based on Poutmin. A typical automatic gain control circuit adjusts the amplifier gain such that the detected highest value falls within a target white level range that is normally close to the upper limit of the output dynamic range. In this case, if a value greater than Pinmin, for example, Pinmax, is output from the line sensor after the automatic gain control is performed and Poutmax corresponding to Pinmax is greater than the maximum value that can be expressed by the number of output bits, the maximum value is continuously output instead of Poutmax (this is called "output saturation"). The output saturation continues until the level of the analog image signal from the line sensor 2 becomes less than or equal to Pinmin. If the output saturation occurs in an image signal processing circuit of an image scanning device, the image scanning device may fail.

One method to prevent this problem is to scan the reference white plate 108 multiple times to obtain multiple sets of digital image data and to perform the automatic gain control based on the highest value in the multiple sets of digital image data. With this method, however, it is necessary to scan the reference white plate 108 several-hundred times to obtain a sufficiently accurate "highest value" (peak level), and this in turn increases the time necessary for the automatic gain control.

Meanwhile, in this embodiment, the amplifier gain of the VGA 13 is adjusted based on first digital image data obtained by scanning the reference white plate 108 once at the beginning of the amplifier gain setting process (first scanning operation); and if the highest value of second digital image data obtained by scanning the reference white plate 108 after adjusting the amplifier gain of the VGA 13 (second scanning operation) exceeds a predetermined range, the amplifier gain of the VGA 13 is decreased by one step (e.g., 3 dB). Since the step size (e.g., 3 dB) for changing the amplifier gain of the VGA 13 is generally greater than the variation of the highest value of digital image data between scanning operations, it is possible to effectively prevent the output saturation by decreasing the amplifier gain of the VGA 13 by one step. This method or configuration eliminates the need to scan the reference white plate 108 after the second scanning operation to adjust the amplifier gain of the VGA 13, and thereby makes it possible to reduce the time for scanning the reference white plate 108 and the time for the automatic gain control.

If Pinmax is not output in the first and second scanning operations in the amplifier gain setting process but is output for the first time when the white reference plate 108 is scanned in the multiplier coefficient setting process for the digital amplifier 15, the output saturation of the digital image data might occur. However, the probability of the occurrence of such output saturation is vanishingly low.

Thus, the above embodiment makes it possible to reduce the number of times the reference white plate 108 is scanned to set the amplifier gain of the VGA 13 and thereby makes it possible to reduce the time necessary for the automatic gain control. The above embodiment also makes it possible to reduce the probability of the occurrence of output saturation of digital image data, to reduce the number of errors in an image signal processing circuit, and thereby to reduce the number of failures of an image scanning device.

An aspect of this disclosure makes it possible to quickly and accurately adjust the amplifier gain of an image scanning device even when there is a flaw or dust on a reference white plate.

The present invention is not limited to the specifically disclosed embodiments, and variations and modifications may be made without departing from the scope of the present invention.

What is claimed is:

1. An image scanning device, comprising:
  an image sensor obtaining an analog image signal;
  a variable gain amplifier amplifying the analog image signal;
  an analog-to-digital converter converting the amplified analog image signal into digital image data;
  a highest value detection unit detecting a highest value in the digital image data; and
  an amplifier gain setting unit setting an amplifier gain of the variable gain amplifier,
  wherein the amplifier gain setting unit initially sets the amplifier gain of the variable gain amplifier such that the highest value in first digital image data of a reference image falls within a predetermined range, and further, the amplifier gain setting unit initially sets the amplifier gain of the variable gain amplifier based on the highest value in the first digital image data that is obtained by scanning the reference image once;
  wherein when the highest value in second digital image data of the reference image obtained with the initially-set amplifier gain exceeds the predetermined range, the amplifier gain setting unit decreases the amplifier gain of the variable gain amplifier; and
  wherein the amplifier gain setting unit decreases the amplifier gain of the variable gain amplifier when an average of the highest values in multiple sets of the second digital image data obtained by scanning the reference image multiple times exceeds the predetermined range.

2. The image scanning device as claimed in claim 1, further comprising:

a digital amplifier multiplying the digital image data by a multiplier coefficient to amplify the digital image data; and a multiplier coefficient setting unit setting the multiplier coefficient of the digital amplifier, wherein the multiplier coefficient setting unit sets the multiplier coefficient of the digital amplifier such that the highest value in the second digital image data of the reference image or the highest value in third digital image data of the reference image obtained with the decreased amplifier gain falls within the predetermined range.

3. An image forming apparatus, comprising:

the image scanning device of claim 1; and an image forming unit printing the digital image data on a recording medium.

4. A method of processing an image signal performed by an image scanning device, the method comprising:

obtaining an analog image signal with an image sensor;

amplifying the analog image signal with a variable gain amplifier;

converting the amplified analog image signal into digital image data;

detecting a highest value in the digital image data;

initially setting an amplifier gain of the variable gain amplifier such that the highest value in first digital image data of a reference image falls within a predetermined range, and further, initially setting the amplifier gain of the variable gain amplifier based on the highest value in the first digital image data that is obtained by scanning the reference image once; and decreasing the amplifier gain of the variable gain amplifier when the highest value in second digital image data of the reference image obtained with the initially-set amplifier gain exceeds the predetermined range, wherein the amplifier gain of the variable gain amplifier is decreased when an average of the highest values in multiple sets of the second digital image data obtained by scanning the reference image multiple times exceeds the predetermined range.

5. The method as claimed in claim 4, further comprising:

multiplying the digital image data by a multiplier coefficient with a digital amplifier to amplify the digital image data, wherein the multiplier coefficient of the digital amplifier is set such that the highest value in the second digital image data of the reference image or the highest value in third digital image data of the reference image obtained with the decreased amplifier gain falls within the predetermined range.

6. An image scanning device, comprising:

means for obtaining an analog image signal;

means for amplifying the analog image signal by an amplifier gain;

means for converting the amplified analog image signal into digital image data;

means for detecting a highest value in the digital image data; and means for setting the amplifier gain, wherein the means for setting the amplifier gain initially sets the amplifier gain such that the highest value in first digital image data of a reference image falls within a predetermined range, and further, the means for setting the amplifier gain initially sets the amplifier gain based on the highest value in the first digital image data that is obtained by scanning the reference image once;

wherein when the highest value in second digital image data of the reference image obtained with the initially-set amplifier gain exceeds the predetermined range, the means for setting the amplifier gain decreases the amplifier gain; and wherein the means for setting the amplifier gain decreases the amplifier gain when an average of the highest values in multiple sets of the second digital image data obtained by scanning the reference image multiple times exceeds the predetermined range.

7. The image scanning device as claimed in claim 6, further comprising:

means for multiplying the digital image data by a multiplier coefficient to amplify the digital image data; and means for setting the multiplier coefficient, wherein the means for setting the multiplier coefficient sets the multiplier coefficient such that the highest value in the second digital image data of the reference image or the highest value in third digital image data of the reference image obtained with the decreased amplifier gain falls within the predetermined range.

* * * * *